US010831883B1

(12) United States Patent
Pawar et al.

(10) Patent No.: US 10,831,883 B1
(45) Date of Patent: Nov. 10, 2020

(54) PREVENTING APPLICATION INSTALLATION USING SYSTEM-LEVEL MESSAGES

(71) Applicant: NortonLifeLock Inc., Tempe, AZ (US)

(72) Inventors: Shrikant Pawar, Mumbai (IN); Sharad Subhash Mhaske, Ahmednagar (IN); Arif Mohammed Shaikh, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 189 days.

(21) Appl. No.: 15/923,880

(22) Filed: Mar. 16, 2018

(51) Int. Cl.
*G06F 21/00* (2013.01)
*G06F 21/51* (2013.01)
*G06F 21/57* (2013.01)
*G06F 21/55* (2013.01)

(52) U.S. Cl.
CPC ............ *G06F 21/51* (2013.01); *G06F 21/554* (2013.01); *G06F 21/57* (2013.01); *G06F 2221/034* (2013.01)

(58) Field of Classification Search
CPC .......... G06F 21/00; G06F 21/56; G06F 21/51; G06F 21/57; G06F 21/554; G06F 2221/034
See application file for complete search history.

(56) References Cited

U.S. PATENT DOCUMENTS

| 7,739,682 | B1 * | 6/2010 | Badenell | G06F 21/51 |
| | | | | 717/174 |
| 8,347,386 | B2 * | 1/2013 | Mahaffey | G06F 21/564 |
| | | | | 726/23 |
| 9,947,031 | B2 * | 4/2018 | Hochberg | G06Q 30/06 |
| 2002/0103789 | A1 * | 8/2002 | Turnbull | G06F 16/9535 |
| 2014/0026228 | A1 * | 1/2014 | Isozaki | G06F 21/50 |
| | | | | 726/27 |
| 2014/0181013 | A1 * | 6/2014 | Micucci | H04L 63/08 |
| | | | | 707/610 |
| 2014/0280373 | A1 * | 9/2014 | Raitto | G06F 16/24542 |
| | | | | 707/803 |
| 2015/0019480 | A1 * | 1/2015 | Maquaire | G06F 16/23 |
| | | | | 707/609 |
| 2018/0203866 | A1 * | 7/2018 | Surcouf | G06F 16/122 |
| 2018/0275840 | A1 * | 9/2018 | Jeong | G06F 3/04842 |
| 2019/0311328 | A1 * | 10/2019 | German | G06Q 10/101 |

OTHER PUBLICATIONS

IBM: Enabling a Java security manager and specifying policy files for a JVM https://www.ibm.com/support/knowledgecenter/en/SSGMCP_4.1.0/com.ibm.cics.ts.java.doc/topics/dfhpj5u.html (Year: 2017).*

* cited by examiner

*Primary Examiner* — Mahfuzur Rahman
(74) *Attorney, Agent, or Firm* — FisherBroyles, LLP

(57) ABSTRACT

Methods and systems are provided for preventing the installation of malicious applications using system-level messages. One example method generally includes intercepting a request sent via an operating system of the computing device; determining the request is to access an application in a remote application repository; obtaining information associated with the application from the request; transmitting, over a network, the information to a security server; and receiving, over the network, a security recommendation for the application from the security server.

20 Claims, 6 Drawing Sheets

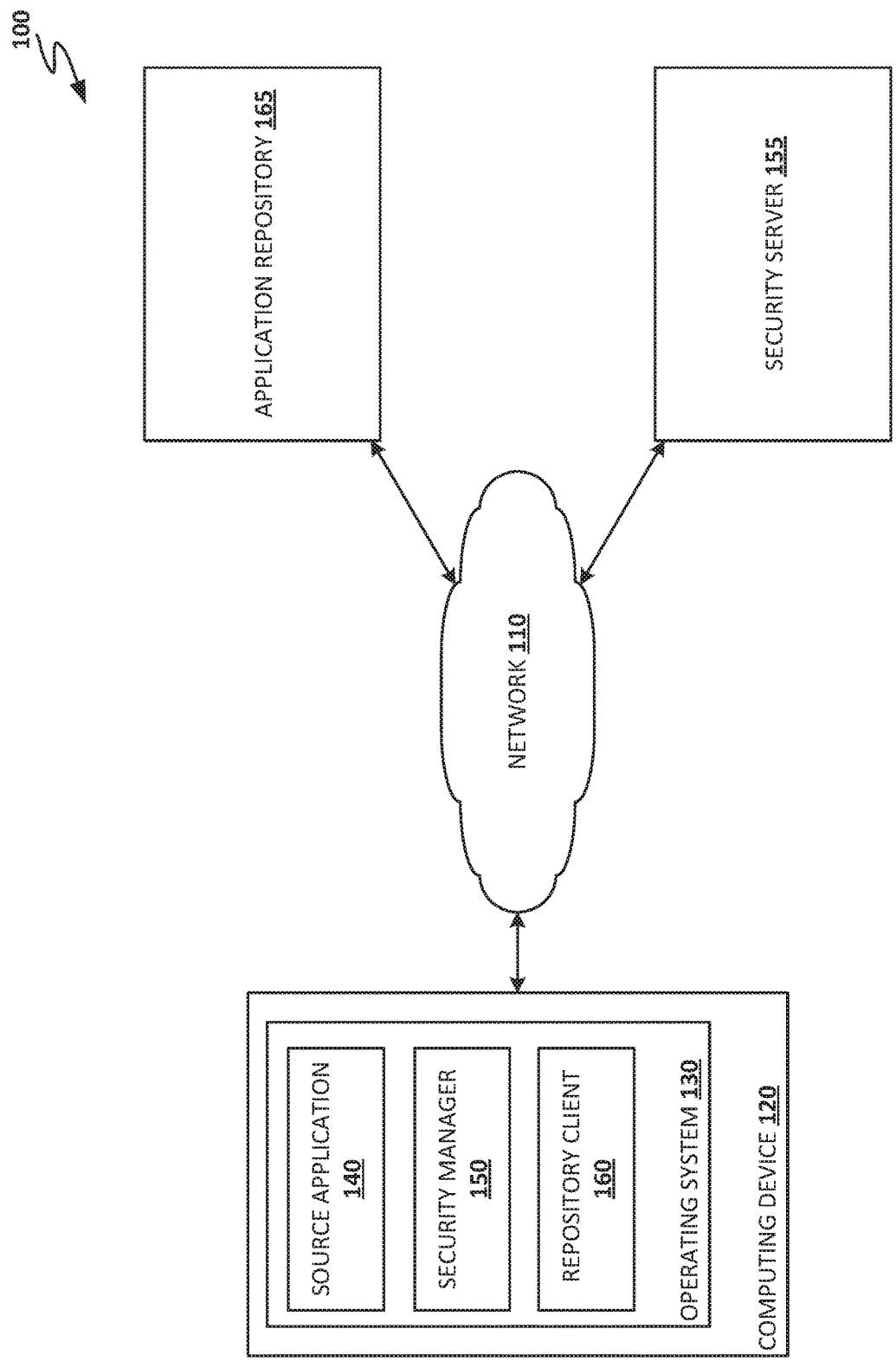

PREVENTING APPLICATION INSTALLATION USING SYSTEM-LEVEL MESSAGES

BACKGROUND

Field

Embodiments of the present invention generally relate to applications of computing devices, and more particularly to limiting the installation of applications on computing devices by malicious entities.

Description of the Related Art

Computing devices, such as smart phones or personal computers, may provide limited functionality without access to external or third-party applications. Developers of computing device operating systems, especially smart phones, may therefore provide access to external applications by application repositories approved by the developer. However, even if monitored by the developer, malicious applications may be accessible through such application repositories. As a result, computing-device users should be judicious as to which external applications are installed, or even as to which applications are viewed, as merely viewing an application may enable malicious files to be installed in some situations.

However, despite a user's best efforts, malicious applications may be accessed through the application repository. A previously installed application, such as an internet browser, may be able to send a request to an on-device repository client to access an application in the application repository. Simply accessing the application may enable the application to be installed or create shortcuts on the computing device without user interaction. For example, an internet browser installed on the computing device may, after loading a malicious website, send a request to access a malicious application associated with the malicious website. If the request proceeds, the malicious application may be installed without further user action.

Existing solutions to this problem rely on utilities provided by the developer of a given operating system. These utilities can obtain the content displayed by the computing device. Content can be obtained by such a utility once the application has been opened to view. This obtained content can be used to identify the application and evaluate possible security risks. This solution may not work on all computing devices in all situations, however. For instance, if an earlier, unsupported version of the operating system is installed, the content-obtaining utility may be unavailable, and the solution may not work. Further, the content-obtaining utility may be unsupported on certain devices entirely. Moreover, this solution only works after the application has been opened for viewing, which already may be too late to prevent the installation of all malicious files. Therefore, systems and methods are desired that can identify malicious applications and prevent their installation before the malicious applications are opened for viewing.

SUMMARY

One embodiment is a method for preventing installation of malicious applications on a computing device using system-level messages. The method generally includes intercepting a request sent via an operating system of the computing device; determining the request is to access an application in a remote application repository; obtaining information associated with the application from the request; transmitting, over a network, the information to a security server; and receiving, over the network, a security recommendation for the application from the security server.

Another embodiment is a computing device. The computing device includes a processor and a memory coupled to the processor. The memory has instructions stored thereon which, when executed by the processor, perform operations for preventing installation of malicious applications on the computing device using system-level messages. The operations generally include intercepting a request sent via an operating system of the computing device; determining the request is to access an application in a remote application repository; obtaining information associated with the application from the request; transmitting, over a network, the information to a security server; and receiving, over the network, a security recommendation for the application from the security server.

Still another embodiment is a non-transitory computer-readable medium having instructions stored thereon which, when executed by a processor of a computing device, perform operations for preventing installation of malicious applications on the computing device using system-level messages. The operations generally include intercepting a request sent via an operating system of the computing device; determining the request is to access an application in a remote application repository; obtaining information associated with the application from the request; transmitting, over a network, the information to a security server; and receiving, over the network, a security recommendation for the application from the security server.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 1 conceptually illustrates an example computing environment in which systems of the present disclosure may operate, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2A:
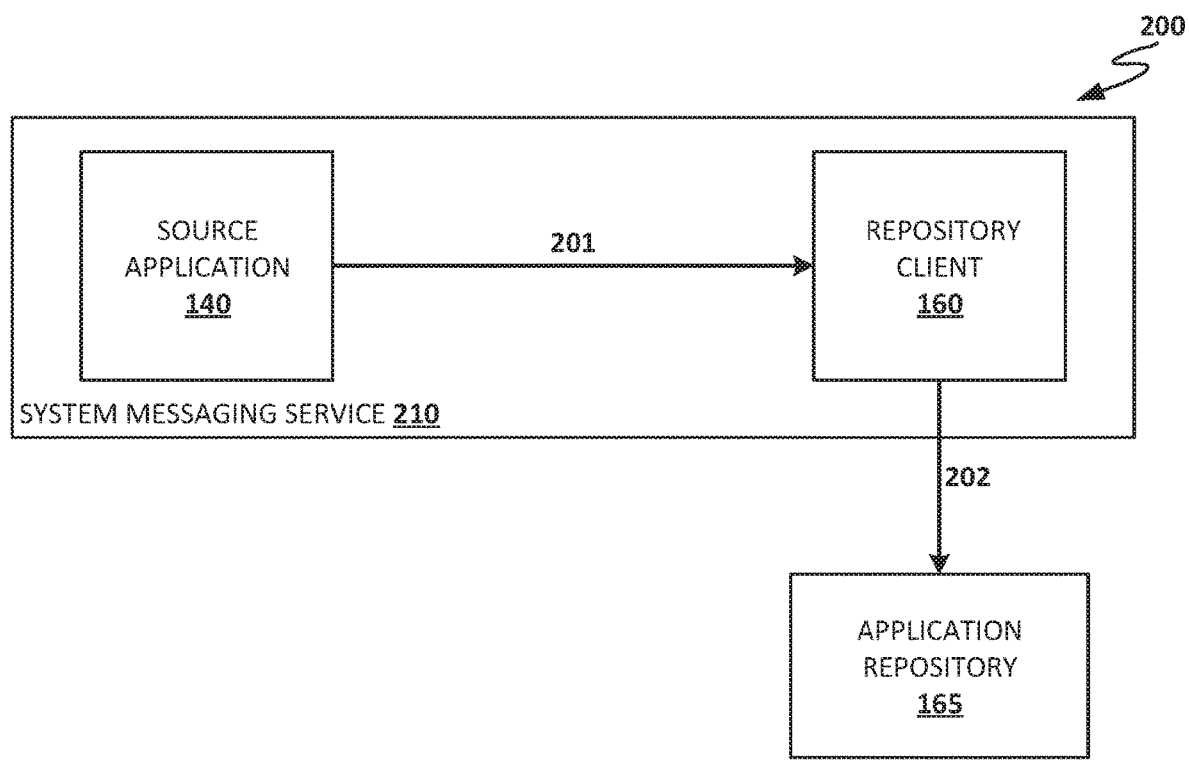
FIGS. 2A and 2B illustrate two example routes of a request to access an application repository, according to embodiments.

Existing security software may be unable to effectively prevent access to malicious applications stored in application repositories or on digital distribution platforms. Although such repositories or platforms may be curated or monitored by the creators of those repositories or platforms, certain malicious files may escape detection and thus remain available for download, at least temporarily. Additionally, there may be files or applications which are determined by the creators of repositories to be non-malicious, but which may nonetheless include some features of malicious software. For example, a given application may not attempt to install a virus and so be cleared by a creator, but may display numerous intrusive ads or collect personal data from a user. Following a link to a malicious file so hosted may enable the file or a shortcut to the file to be installed on a user's computing device. This can be true if the malicious file's page or entry in the repository is merely viewed rather than installed, and installation may occur without user action in some cases.

Existing solutions to this problem rely on services or utilities provided by the developer of an operating system to obtain information which may otherwise be unobtainable. For example, user accessibility services available on the Android operating system may enable information, including screen content, to be obtained by security software. This screen content can be evaluated for information to identify malicious applications or files. In the example of a file opened in an application repository, the screen content may include the page or entry of the malicious application, which could be used to identify the malicious application in question and prevent its installation.

However, the above described solution has several shortcomings. First, the various utilities and services involved for its operations may not be available. Returning to the case of Android, accessibility services are only available on newer versions of the Android operating system. Some computing devices may not have a sufficiently recent version to make use of those services, while other computing devices may be incapable of upgrading to a version of the operating system that supports accessibility services. Second, the various utilities and services implicated may have variant operation across different computing devices from different manufacturers. As a result, this solution may be unreliable and inconsistent, even if this solution may work on a particular smart phone. Third, and perhaps most importantly, this solution can prevent installation of an untrustworthy application in some cases, but works only after the untrustworthy application has been viewed. Consequently, malicious files may be installed before this solution can identify any problems.

The present disclosure relates to systems and methods for preventing access to application repositories while avoiding the limitations of the existing solutions. The present disclosure provides a security manager to manage security events, including access to an application repository. The security manager prevents access to the application repository by intercepting messages sent by an operating system intended for a local client of an application repository. For example, on the Android operating system, messages can be sent between applications using a class of programming objects called "Intent." That is, a source application may send Intent to open an application within an application repository. The security manager can accept and read this Intent message before the message reaches a local client of the application repository, which would be the typical recipient of the message.

By intercepting this message, data contained in the message can be extracted by the security manager. This data may specify a unique identifier for an application, such as a name of an application, a package name of an application, and so forth. Data contained in the message may also include a link to an entry of the application within an application repository. This data can be transmitted by the security manager to a remote security server, which can evaluate the application and return, over the network, a full analysis of the application as well as a security recommendation for the application. The full analysis and the security recommendation may be provided to the user via a graphical user interface (GUI), and/or may be used by the security manager to either prevent or allow access.

Embodiments of the present disclosure avoid the problems of existing solutions. Because certain embodiments of the present disclosure work using operating system-level messages, such embodiments do not require any particular version of the operating system to function, and can work across different computing devices from different manufacturers. Further, because certain embodiments of the present disclosure operate on system-level messages, such embodiments can prevent access to the application repository before a malicious application is viewed and so prevent the installation of more malicious files than existing solutions.

FIG. 1 illustrates an example computing environment 100 in which systems of the present disclosure may operate, according to one embodiment. Computing environment 100 includes network 110, computing device 120, application repository 165, and security server 155.

Computing device 120 is representative of personal computing devices, including desktop computers, laptop computers, tablets, or smart phones. Computing device 120 includes an operating system 130 to execute the basic functions of computing device 120, including controlling communication between different applications of computing device 120. Shown within operating system 130 are three applications: source application 140, security manager 150, and repository client 160.

Security manager 150 operates to preserve the security of computing device 120, including preventing the installation of malicious files and preventing access to computing device 120 by unauthorized sources. Security manager 150 may communicate with security server 155 over network 110 to carry out various security tasks. Security server 155 is a remote server capable of processing requests from security manager 150 in addition to other security managers on other computing devices. Security server 155 is shown as a single unit but may be a distributed computing or cloud computing system comprising many physical hardware units in addition to a single physical unit. Security manager 150 may request an evaluation of a specific application on computing device 120 or within application repository 165 from security server 155.

Repository client 160 is a local counterpart to application repository 165. Application repository 165 is a remote storage of third party or external applications that may be transmitted over network 110 and executed on computing device 120. Repository client 160 serves as an endpoint for transmissions from application repository 165 and as a source point for transmissions to application repository 165. Application repository 165 may exclusively store applications for execution on operating system 130 and may be developed and maintained by the same entity or group as operating system 130. One entity may create an operating system for a smart phone, and a corresponding application repository of applications that can execute in that operating system. For example, Google LLC develops the Android operating system for smart phone and tablet devices, and Google also maintains the Google Play Store, which allows access to Android-compatible applications. As another example, Apple Inc. develops and maintains the iOS operating system and the iOS App Store, which allows access to iOS-compatible applications.

Source application 140 is an application which executes on computing device 120. Source application 140 transmits a request, through operating system 130 to repository client 160, to access a particular application in application repository 165. The particular application requested may be malicious. Source application 140 may itself be an unwanted or malicious application, or may be a trustworthy application being used as a conduit for a malicious application. For example, an internet browsing application may be used to transmit a request to repository client 160. To prevent source application 140 from accessing malicious applications through repository client 160, security manager 150 may intercept the request sent by source application 140.

If security manager 150 intercepts the request sent by source application 140, security manager 150 may obtain data from the request and transmit that data over network 110 to security server 155 for full analysis. Security server 155 may analyze the data transmitted, identify the application in question, and generate a security recommendation for the application. As used herein, a security recommendation generally refers to a complete profile of an application within an application repository. In one embodiment, a user of computing device 120 may use the security recommendation to decide to allow access to the application or not. In other embodiments, security manager 150 may use the security recommendation to allow or deny access to the application without user interaction.

FIG. 2A illustrates example route 200 of a request to access an application repository.

Route 200 includes system messaging service 210, source application 140, repository client 160, and application repository 165. System messaging service 210 may be a component of an operating system, such as operating system 130 of FIG. 1. System messaging service 210 is used as a means of communication between different applications executing on a computing device. Messages sent by system messaging service 210 may be system-level messages, meaning the operating system originates and routes the message.

Route 200 represents a standard messaging route for system-level messages when source application 140 requests to access an application stored in application repository 165. Source application 140 generates a request, and this request may be sent via communication 201 to repository client 160. Communication 201 is internal to system messaging service 210. After receiving communication 201, repository client 160 transmits communication 202 to application repository 165. Communication 202 is external to system messaging service 210, meaning communication 202 travels beyond the operating system and may be transmitted by the computing device over a network to application repository 165.

Figure 2B:
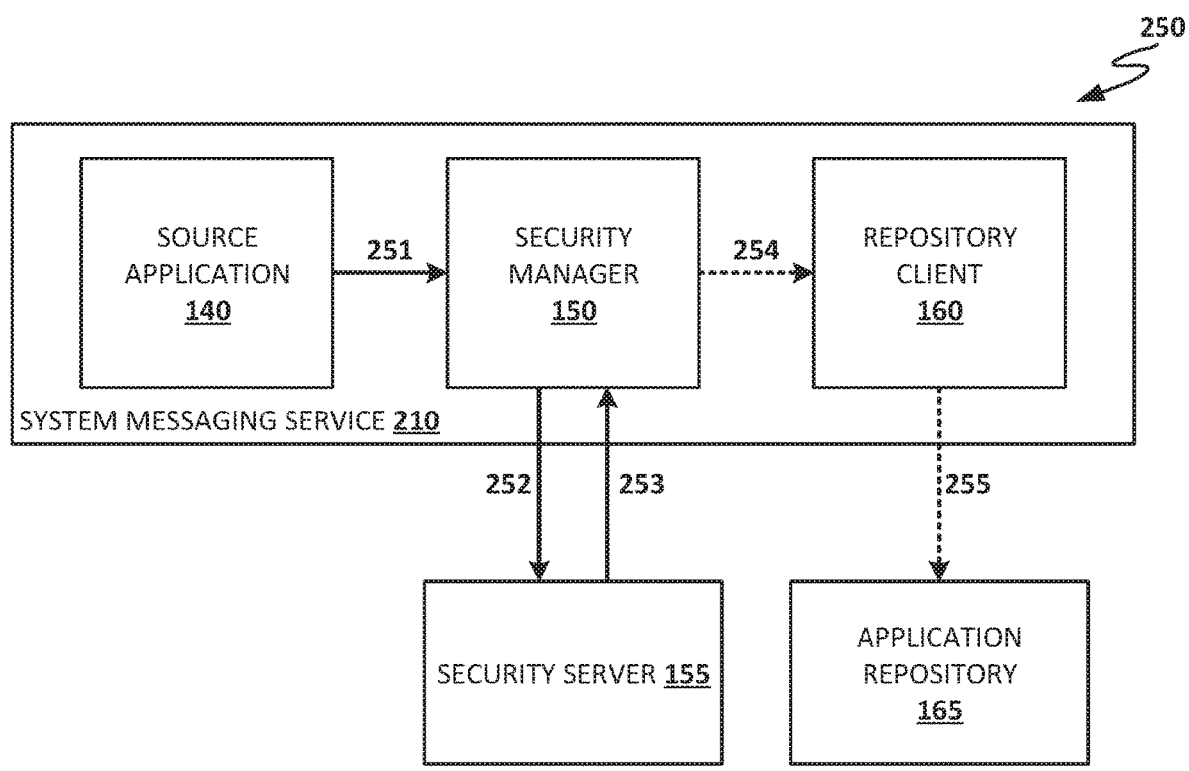

FIG. 2B illustrates example route 250 of a request to access an application repository. Route 250 includes system messaging service 210, source application 140, security manager 150, security server 155, repository client 160, and application repository 165.

In route 250, source application 140 generates a request to access an application in application repository 165. Source application 140 may attempt to send this request directly to repository client 160 at communication 251. However, security manager 150 intercepts communication 251.

After intercepting communication 251, security manager 150 may obtain data from the request and send this data to security server 155 via communication 252. Communication 252 is external to system messaging service 210, and thus may be transmitted over a network using networking hardware of the computing device. Security server 155 may analyze the information sent in communication 252 and identify the application specified in the request.

Security server 155 may then obtain a security recommendation for the specified application. For example, the security recommendation may be generated by security server 155 if the specified application was previously unknown, or may be retrieved from a database if the specified application is known. The security recommendation and details of the specified application are then transmitted back to security manager 150 via communication 253. Communication 253 is a communication external to system messaging service 210.

After receipt of communication 253, security manager 150 may make use of the security recommendation in a number of ways. In one embodiment, security manager 150 may display the security recommendation to the user, allowing the user to make a decision about application access. In another embodiment, security manager 150 may autonomously allow or deny access to the application. If access is allowed, security manager 150 may forward the request to repository client 160 via communication 254. If the request is received, repository client 160 may request to access the application in application repository 165 via communication 255.

In existing solutions to limiting access of malicious applications to computing devices, messages sent at the system level are not intercepted. Instead, the information returned from application repository 165 may be obtained and examined. That is, existing solutions perform the bulk of their activity after the last communication shown in route 200 of FIG. 2A. After the last communication of route 200, application repository 165 transmits a response to repository client 160. This response is the data which existing solutions can make use of. Because information has already been returned from application repository 165 to the computing device, malicious files may have already been transmitted at this time. By identifying threats before transmissions are made between the computing device and the application repository, the present disclosure offers more reliability than existing solutions. The present disclosure also offers more general applicability than existing solutions, as the present disclosure is not limited to any particular version of an operating system.

Figure 3:
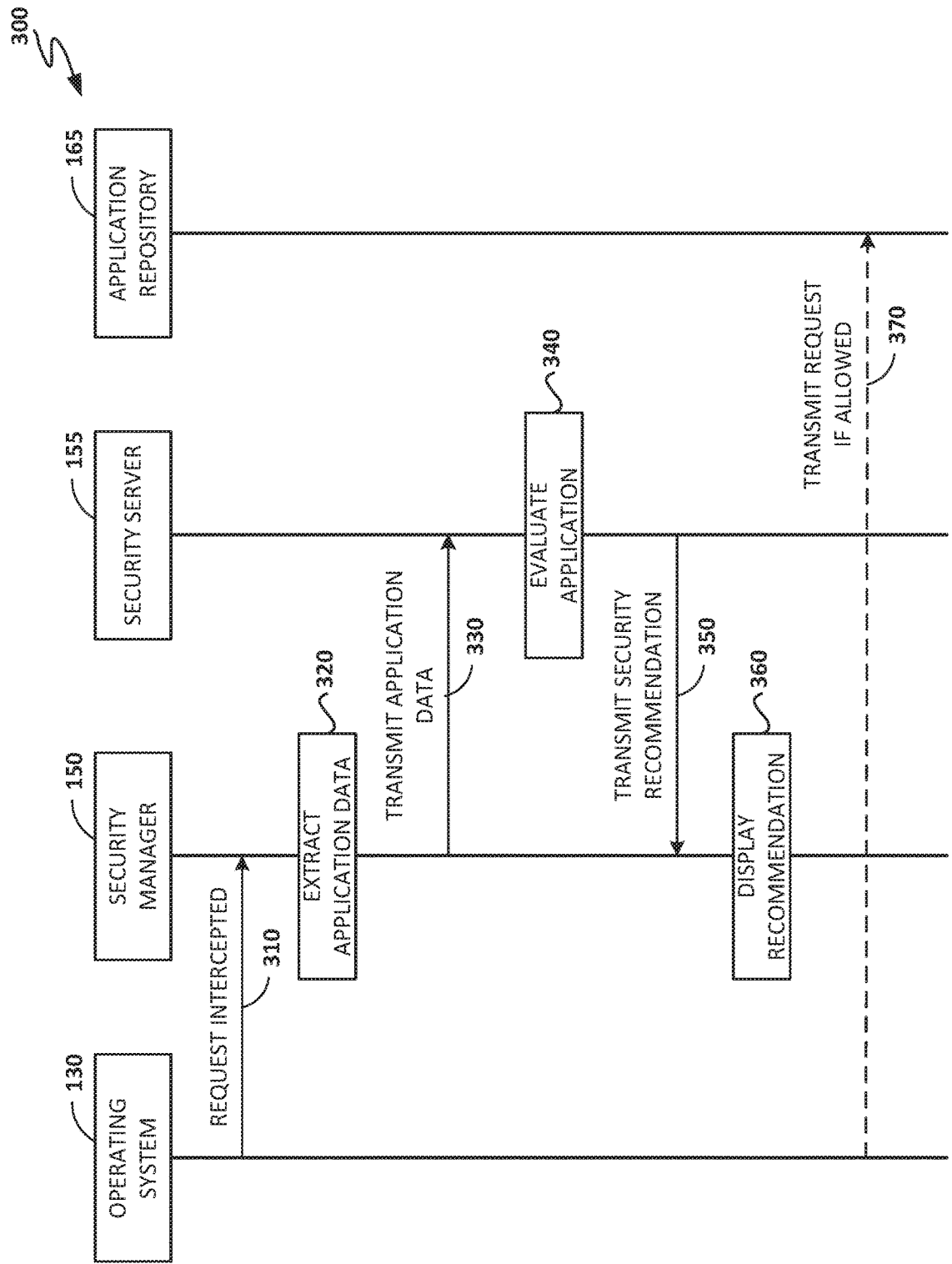
FIG. 3 is a call-flow diagram representing example operations for preventing the installation of malicious applications, according to one embodiment.

FIG. 3 is a call-flow diagram representing example operations 300 for preventing the installation of malicious applications.

The operations 300 may begin at communication 310, where operating system 130 attempts to send a message to application repository 165, via a repository client. Communication 310 is sent by operating system 130 but may have originated from a separate application. The message intended for application repository 160 may be a request to access a specific application stored in application repository 165. Communication 310 is intercepted, however, by security manager 150. Intercepting the communication may be unintended or unexpected by operating system 130 in some embodiments. In other embodiments, operating system 130 may expect the interception, and a user may be able to effectively set security manager 150 as a default target for such requests.

At block 320 security manager 150 extracts application data from the intercepted request. Extracting application data may include locating a unique identifier for an application specified in the request, such as a name of an application, a package name of an application, or other unique identifiers. Extracting application data may also involve identifying a link to an application entry within application repository 165. Security manager 150 may transmit the extracted application data to security server 155 via communication 330. Communication 330 may be a transmission over a network using networking hardware of a computing device executing operating system 130.

At block 340 security server 155 evaluates the application specified in the request. Evaluation may involve performing an analysis of the application or may involve retrieving previously created information about the application from a database. Evaluation of an application results in a security recommendation for the application. The security recommendation is a general description of the application and the application's behavior. For example, a security recommendation may be a label such as "safe," "trusted," or "trustworthy" for applications which are known or otherwise determined to not be malicious, a label such as "possible risk" or "risks unknown" for applications for which there is not a complete analysis available, or a label such as "risk," "privacy risk," "unusual behavior," "high battery usage," "high data usage," or "malicious" for applications which are known or otherwise determined to be malicious. A security recommendation may also include a list of features that the application should be allowed to access. For example, an application may generally be safe but may be restricted from accessing certain features or functions of a computing device, like a camera of a smart phone. Security server 155 may transmit an indication of the security recommendation to security manager 150 via communication 350, again over the network.

At block 360 security manager 150 may optionally display the recommendation to a user of the computing device. In other embodiments, security manager 150 may act on the recommendation autonomously, by either denying or allowing access to the application depending on the content of the security recommendation. If security manager 150 displays the recommendation to the user, the user can make a decision on whether to allow or deny access. If access is allowed, operating system 130 may send the request to application repository 165 via communication 370.

Figure 4:
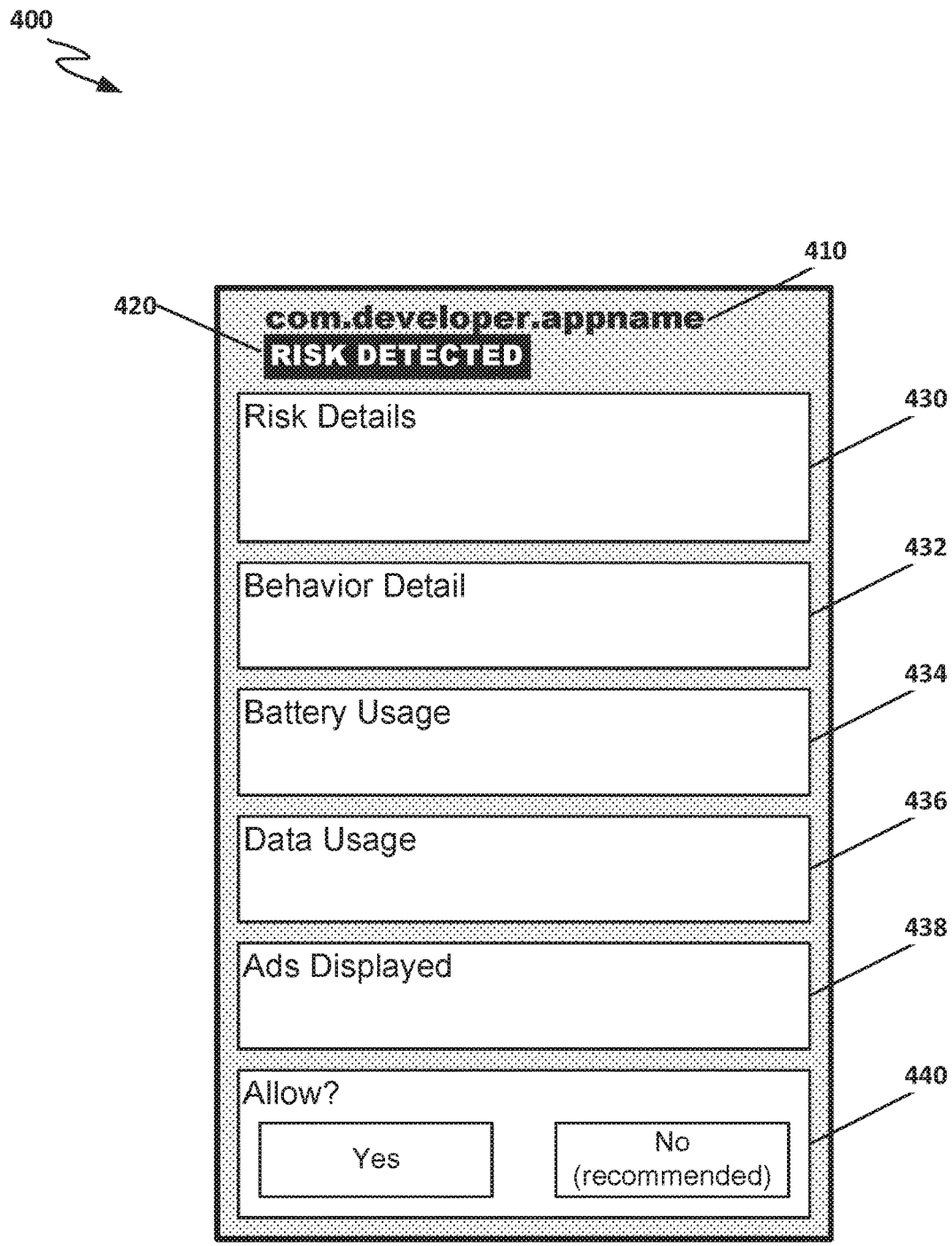
FIG. 4 is an example graphical user interface according to one embodiment.

FIG. 4 is an example graphical user interface (GUI) 400 according to one embodiment. GUI 400 may be displayed to a user of a computing device by a security manager (e.g., security manager 150) upon receipt by the security manager of a security recommendation. GUI 400 is used to display the security recommendation to the user. GUI 400 may include unique identification component 410, label component 420, application details components 430-438, and decision component 440.

The application in question has the name "appname," and is produced by "developer" as shown in unique identification component 410. Unique identification component 410 in this example shows a package name, but may also show an application name or other unique identifier. The security recommendation illustrated is a negative or risk-identification recommendation, as shown by label component 420.

Risk details component 430 displays the details of the risk posed by the application. Risk details component 430 may display for a user any malicious features or requests of the application. For example, risk details component 430 may display an indication that the application monitors user behavior or an indication that the application attempts to collect personal information. Risk details component 430 may also display summarized versions of information provided more specifically in components 432-438.

Behavior detail component 432 may display the specifics of malicious behaviors of the application, including system resources accessed by the application, actions performed by the application, communications sent to external devices by the application, or any other behavioral details. Battery usage component 434 displays how much battery power is used by the application during execution. Data usage component 436 displays an amount of data consumed by the application, typically by communications to external devices. Advertisements displayed component 438 displays information related to advertisements displayed by the application. Such advertisements may correspond generally to the amount of data consumed by the application, and may indicate intrusive behavior unwanted by the user. Excessive advertisements can be disruptive to user operation of the computing device.

Decision component 440 displays options for the user to either allow or deny access to the application. As shown, there are two options made available, "yes" and "no," although in other embodiments other options may be available, such as to allow the application to install but limit the application's access to system resources. For example, an application may be allowed to install, but access to storage devices of the computing device may be limited for the application. Also as shown, GUI 400 features a recommended option for the user. In this case, due to the security risks detailed elsewhere in GUI 400, "no" is the recommended option.

Figure 5:
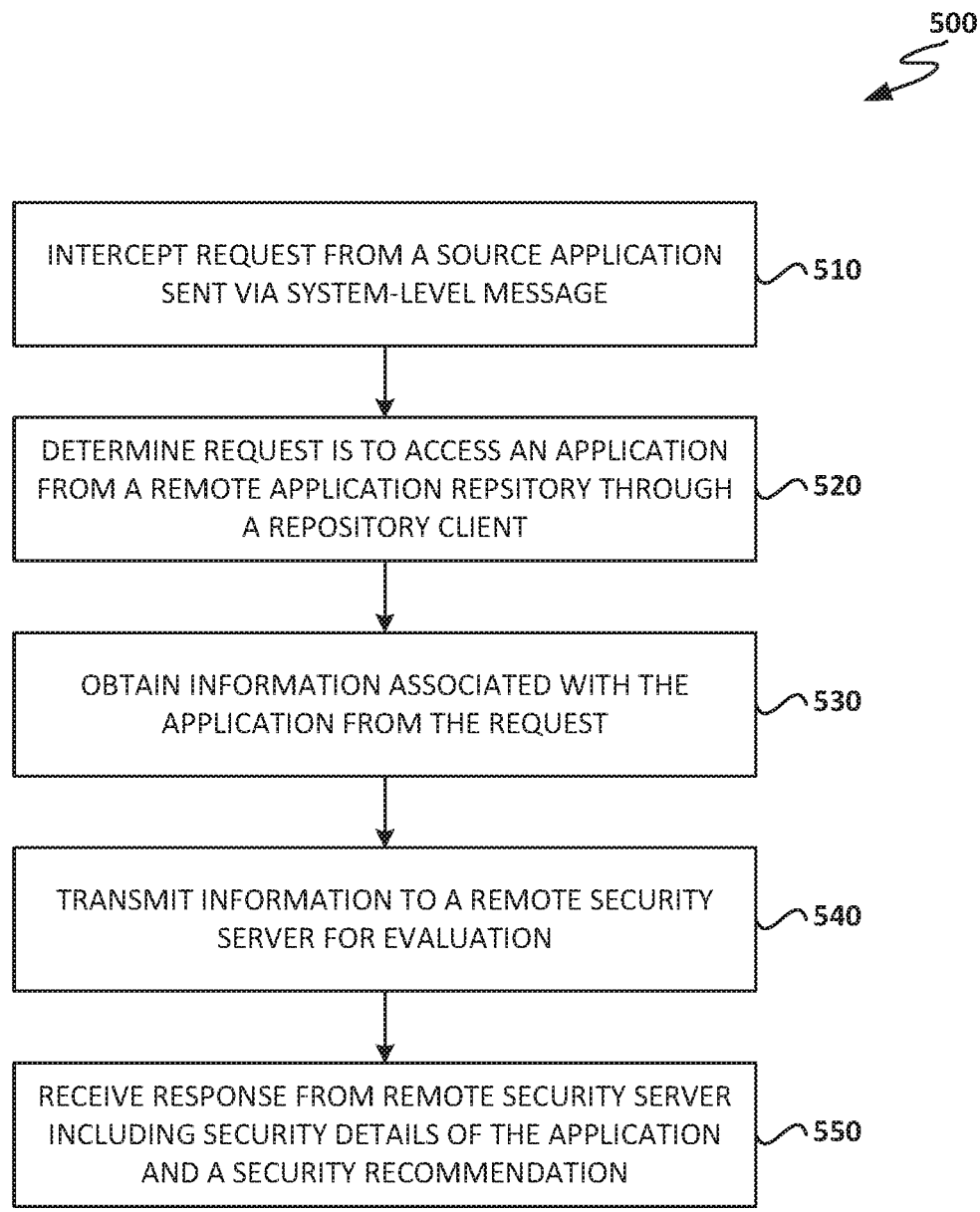
FIG. 5 is a flow diagram of example operations for preventing the installation of malicious applications using system-level messages according to one embodiment.

FIG. 5 illustrates example operations 500 for preventing the installation of malicious applications using system-level messages, according to one embodiment.

The operations 500 may begin at block 510, where a request from a source application, sent via a system-level message, is intercepted by a security manager. Intercepting the system-level message may entail the security manager interrupting the delivery of the system-level message. For example, a user may open a link to a given application stored in an application repository. The link may be transferred to a local repository client via a system-level message sent by an operating system. The security manager may prompt the user to open the link with the security manager instead of with the repository client. The computing device may also allow the user to be able to set the security manager as the default service to open all links to applications in application repositories.

After intercepting the system-level message, the operations 500 may proceed to block 520, where the security manager determines the request is to access an application from a remote application repository through a repository client. When the message is intercepted, the security manager can analyze the message and determine the reason for the message and the destination. If the destination is not a local client of an application repository, the security manager may let the message proceed to its destination.

After determining the message is a request to access an application, the operations 500 may proceed to block 530, where the security manager obtains information associated with the application from the request. Information associated with the application may include the name of the application, a link to a page or entry of the application on the application repository, the source of the link, or the process that originated the request. In some cases a non-malicious application, such as an internet browser, may originate the request, while in other cases, a malicious application or script may have originated the request.

After obtaining information related to the application, the operations 500 may proceed to block 540, where the information related to the application is transmitted to a remote security server for full evaluation. Full evaluation may involve analyzing the actions of the application, the requests for system resources made by the application, the number of external communications made by the application, the battery consumed by executing the application, and/or other aspects of the application. In other cases, if the security server has previously evaluated the application, such information may be available in a database of the security server. In either case, the security server uses the information about the application to generate a security recommendation for the application and transmits the security recommendation to the security manager.

After transmitting information to the remote security server, the operations 500 may proceed to block 550, where the security manager receives a response from the remote security server including security details of the application and a security recommendation for the application. After receiving the application details and security recommendation, the security manager may display the security details and the security recommendation for the user. This may be done through a GUI, such as GUI 400 of FIG. 4. If a GUI is presented, the user can decide whether to allow or deny access to the application based on the presented information. In other embodiments, the security manager may instead act on the security recommendation autonomously, either allowing or denying access without user input.

Figure 6:
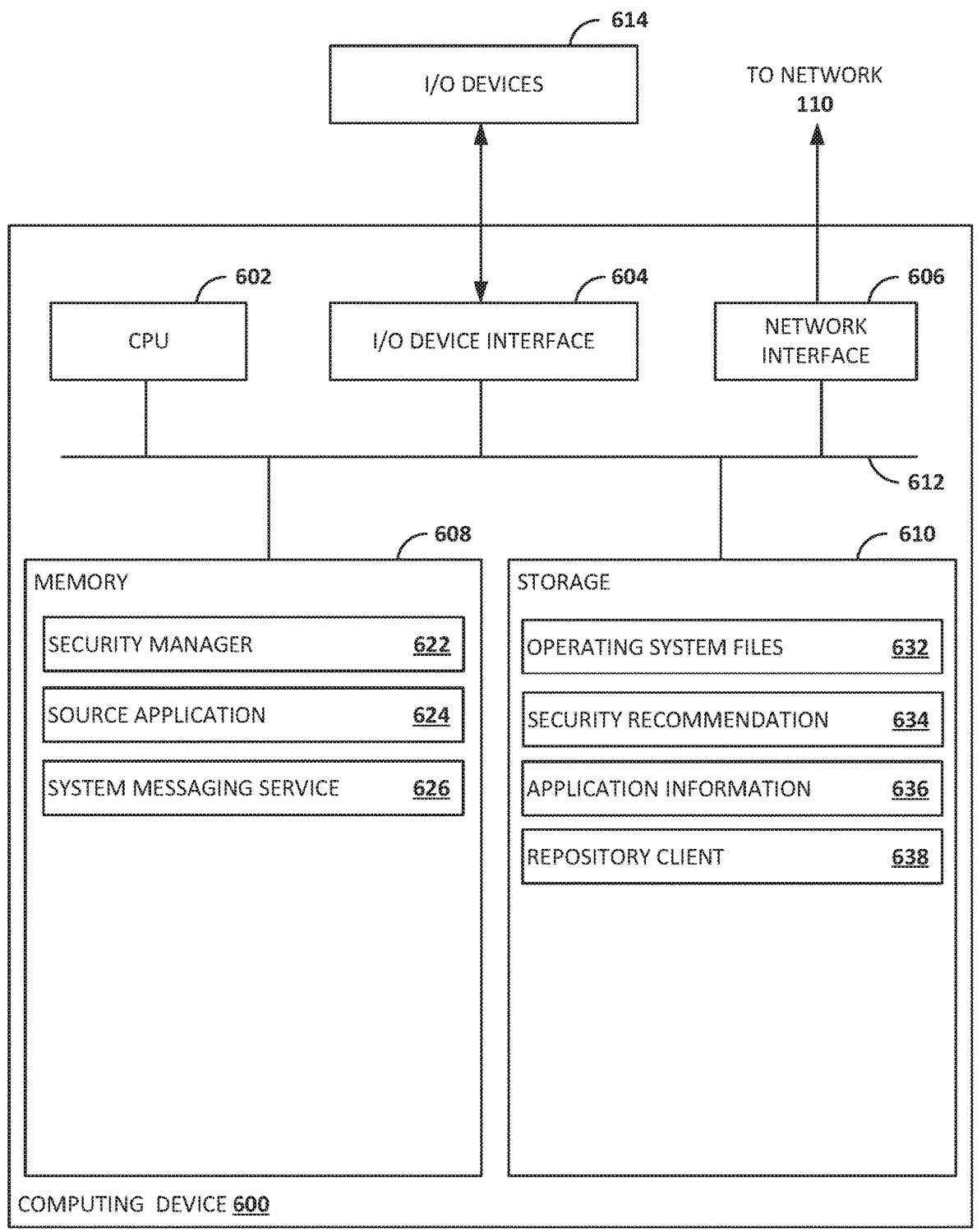
FIG. 6 is a block diagram of an example computing device according to one embodiment.

FIG. 6 illustrates an example computing device 600 according to one embodiment. As shown, the computing device 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to the computing device 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the computing device 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes a security manager 622, source application 624, and system messaging service 626. The security manager 622 may intercept messages sent by the source application 624 via the system messaging service 626. The system messaging service 626 may be part of an operating system of the computing device 600, not shown, also resident in the memory 608. Upon intercepting the request, the security manager 622 may transmit information related to the request over the network 110, via the network interface 606 and interconnect 612. The security manager 622, source application 624, and system messaging service 626 may all be executed based on instructions stored in the storage 610. Such instructions may be executed by the CPU 602.

As shown, the storage 610 includes operating system files 632, security recommendation 634, application information 636, and repository client 638. The security recommendation 634 and application information 636 may be received, for example, over the network 110 from a remote security server. The operating system files 632 may enable functionality for the computing device 600, including the system messaging service 626. The repository client 638 may be used to communicate with a remote application repository over the network 110, for example.

One embodiment of the present disclosure provides a method for preventing installation of malicious applications on a computing device using system-level messages. The method generally includes intercepting a request sent via an operating system of the computing device; determining the request is to access an application in a remote application repository; obtaining information associated with the application from the request; transmitting, over a network, the information to a security server; and receiving, over the network, a security recommendation for the application from the security server.

According to some embodiments, the method further involves displaying the security recommendation for a user of the computing device; and displaying a user interface for the user, wherein the user interface provides options to allow the request or deny the request.

According to some embodiments the method further involves evaluating the security recommendation, generating an access decision based on the security recommendation, and implementing the access decision.

According to some embodiments implementing the access decision involves allowing the request and sending the request to a repository client.

According to some embodiments implementing the access decision involves denying the request and preventing subsequent requests for the same application from reaching a repository client.

According to some embodiments the method further involves receiving details of the application. The details of the application may include at least one of: behavior of the application, battery usage of the application, data usage of the application, and advertisements displayed by the application.

According to some embodiments the method further involves displaying a user interface to the user. In this case, the user interface may provide an option to select a security manager as a default service for all requests to access applications.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable medium(s) having computer-readable program code embodied thereon.

Any combination of one or more computer-readable mediums may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for preventing installation of malicious applications on a computing device using system-level messages, comprising:
    intercepting, by a local security manager on the computing device, a request sent using an intent class of programming objects and that is directed to a local repository client on the same computing device, the request generated by selection of a link to an application stored in a remote application repository;
    determining the request is to access the application in the remote application repository;
    obtaining information associated with the application from the request;
    requesting, from a remote security server, a security recommendation for the application based on the obtained information;
    receiving, over a network, the security recommendation from the security server;
    taking one or more actions to allow or disallow access to the application based at least in part on the received security recommendation;
    transferring the link to the local repository client using the intent class of programming objects; and
    enabling a user to set the security manager as a default service to open links to applications in application repositories.

2. The method of claim 1, further comprising:
    displaying the security recommendation for the user of the computing device; and
    displaying a user interface for the user, wherein the user interface provides options to allow the request or deny the request.

3. The method of claim 1, further comprising:
    evaluating the security recommendation;
    generating an access decision based on the security recommendation; and
    implementing the access decision.

4. The method of claim 1, further comprising the local security manager prompting a user to open the link with the local security manager instead of opening the link with the local repository client.

5. The method of claim 3, wherein implementing the access decision comprises:
    allowing the request; and
    sending the request to the local repository client.

6. The method of claim 1, further comprising receiving details of the application, wherein the details of the application include at least one of:
    behavior of the application;
    battery usage of the application;
    data usage of the application; or
    advertisements displayed by the application.

7. The method of claim 1, further comprising displaying a user interface for the user, wherein the user interface provides an option to select the security manager as the default service for all requests to access applications.

8. A computing device comprising:
    a processor; and
    a memory having instructions stored thereon which, when executed by the processor, perform operations for preventing installation of malicious applications on the computing device using system-level messages, the operations comprising:
        intercepting, by a local security manager on the computing device, a request sent using an intent class of programming objects and that is directed to a local repository client on the same computing device, the request generated by selection of a link to an application stored in a remote application repository;
        determining the request is to access the application in the remote application repository;
        obtaining information associated with the application from the request;
        requesting, from a remote security server, a security recommendation for the application based on the obtained information;

receiving, over a network, the security recommendation from the security server;
taking one or more actions to allow or disallow access to the application based at least in part on the received security recommendation;
transferring the link to the local repository client using the intent class of programming objects; and
enabling a user to set the security manager as a default service to open links to applications in application repositories.

9. The computing device of claim 8, the operations further comprising:
displaying the security recommendation for the user of the computing device; and
displaying a user interface for the user, wherein the user interface provides options to allow the request or deny the request.

10. The computing device of claim 8, wherein taking the one or more actions comprises:
evaluating the security recommendation;
generating an access decision based on the security recommendation; and
implementing the access decision.

11. The computing device of claim 10, wherein implementing the access decision comprises allowing the request.

12. The computing device of claim 11, wherein implementing the access decision comprises sending the request to the local repository client.

13. The computing device of claim 8, the operations further comprising receiving details of the application, wherein the details of the application include at least one of:
behavior of the application;
battery usage of the application;
data usage of the application; or
advertisements displayed by the application.

14. The computing device of claim 8, further comprising a display, wherein the operations further comprise displaying a user interface for the user on the display, wherein the user interface provides an option to select the security manager as the default service for all requests to access applications.

15. A non-transitory computer-readable medium having instructions stored thereon which, when executed by a processor of a computing device, perform operations for preventing installation of malicious applications on the computing device using system-level messages, the operations comprising:
intercepting, by a local security manager on the computing device, a request sent using an intent class of programming objects and that is directed to a local repository client on the same computing device, the request generated by selection of a link to an application stored in a remote application repository;
determining the request is to access the application in the remote application repository;
obtaining information associated with the application from the request;
requesting, from a remote security server, a security recommendation for the application based on the obtained information;
receiving, over a network, the security recommendation from the security server;
taking one or more actions to allow or disallow access to the application based at least in part on the received security recommendation;
transferring the link to the local repository client using the intent class of programming objects; and
enabling a user to set the security manager as a default service to open links to applications in application repositories.

16. The computer-readable medium of claim 15, the operations further comprising:
displaying the security recommendation for the user of the computing device; and
displaying a user interface for the user, wherein the user interface provides options to allow the request or deny the request.

17. The computer-readable medium of claim 15, wherein taking the one or more actions comprises:
evaluating the security recommendation;
generating an access decision based on the security recommendation; and
implementing the access decision.

18. The computer-readable medium of claim 17, wherein implementing the access decision comprises allowing the request.

19. The computer-readable medium of claim 18, wherein implementing the access decision comprises sending the request to the local repository client.

20. The computer-readable medium of claim 15, the operations further comprising displaying a user interface for the user, wherein the user interface provides an option to select the security manager as the default service for all requests to access applications.

* * * * *